US012018633B2

(12) United States Patent
Nagayama et al.

(10) Patent No.: US 12,018,633 B2
(45) Date of Patent: Jun. 25, 2024

(54) EJECTOR, AND HIGH-PRESSURE PASSAGE AND INTAKE HOUSING FOR EJECTOR

(71) Applicants: TOYOTA JIDOSHA KABUSHIKI KAISHA, Aichi-ken (JP); KOJIMA PRESS INDUSTRY CO., LTD., Aichi (JP)

(72) Inventors: Tsukasa Nagayama, Toyota (JP); Takuya Nakagawa, Toyota (JP)

(73) Assignees: TOYOTA JIDOSHA KABUSHIKI KAISHA, Aichi-Ken (JP); KOJIMA PRESS INDUSTRY CO., LTD., Aichi (JP)

( * ) Notice: Subject to any disclaimer, the term of this patent is extended or adjusted under 35 U.S.C. 154(b) by 0 days.

(21) Appl. No.: 18/334,379

(22) Filed: Jun. 14, 2023

(65) Prior Publication Data

US 2023/0407823 A1 Dec. 21, 2023

(30) Foreign Application Priority Data

Jun. 17, 2022 (JP) ................................ 2022-098291

(51) Int. Cl.
*F02M 35/10* (2006.01)
*F02M 25/08* (2006.01)

(52) U.S. Cl.
CPC .. *F02M 35/10262* (2013.01); *F02M 25/0872* (2013.01); *F02M 25/089* (2013.01)

(58) Field of Classification Search
CPC ......... F02M 35/10262; F02M 25/0872; F02M 25/0809; F02M 25/0836; F02D 41/004
See application file for complete search history.

(56) References Cited

U.S. PATENT DOCUMENTS 11,549,467 B2 * 1/2023 Akita ................ F02M 25/0836
2016/0108864 A1 * 4/2016 Tochihara .......... F02M 25/0809 123/519
2018/0163646 A1 * 6/2018 Tsutsumi ......... F02M 35/10222
2019/0048830 A1 2/2019 Akiyama

FOREIGN PATENT DOCUMENTS

JP 2017-067043 A 4/2017

* cited by examiner

*Primary Examiner* — Syed O Hasan
(74) *Attorney, Agent, or Firm* — HAUPTMAN HAM, LLP

(57) ABSTRACT

An ejector includes a high-pressure passage, a low-pressure passage, and a connection passage. The high-pressure passage includes an upstream end and a downstream end. The upstream end is configured to be connected to a passage through which a high-pressure gas flows. The low-pressure passage is connected to the downstream end of the high-pressure passage. The connection passage is connected to a junction of the high-pressure passage and the low-pressure passage. The high-pressure passage is bent at one or more locations between the upstream end and the downstream end.

1 Claim, 4 Drawing Sheets

EJECTOR, AND HIGH-PRESSURE PASSAGE AND INTAKE HOUSING FOR EJECTOR

RELATED APPLICATIONS

The present application claims priority of Japanese Application Number 2022-098291 filed on Jun. 17, 2022, the disclosure of which is hereby incorporated by reference herein in its entirety.

BACKGROUND

1. Field

The present disclosure relates to an ejector, and a high-pressure passage and an intake housing for an ejector.

2. Description of Related Art

Japanese Laid-Open Patent Publication No. 2017-067043 discloses an ejector for a fuel vapor treating device. The ejector includes a high-pressure passage, a low-pressure passage, and a connection passage therein. The high-pressure passage is connected to the low-pressure passage. The high-pressure passage and the low-pressure passage are located on the same straight line. The cross-sectional flow area of the high-pressure passage decreases toward the low-pressure passage. The connection passage is connected to a junction of the high-pressure passage and the low-pressure passage. The central axis of the connection passage is orthogonal to the central axis of the high-pressure passage and the low-pressure passage. That is, the high-pressure passage, the low-pressure passage, and the connection passage are T-shaped as a whole.

The low-pressure passage of the ejector is connected to a section of the intake passage of the internal combustion engine that is on the upstream side of the compressor of a turbocharger. The high-pressure passage of the ejector is connected to a section of the intake passage of the internal combustion engine that is on the downstream side of the compressor of the turbocharger. The passage of the ejector is connected to a canister that collects fuel vapor.

The ejector disclosed in the above publication ejects high-pressure gas is violently ejected from the downstream end of the high-pressure passage to the low-pressure passage. Since the flow velocity of gas in the low-pressure passage is higher than the flow velocity of gas in the high-pressure passage, a negative pressure is generated at the junction of the high-pressure passage and the low-pressure passage, that is, at the connection point of the connection passage. The negative pressure causes the gas in the connection passage to flow into the low-pressure passage. Therefore, the amount of gas flowing from the connection passage into the low-pressure passage depends on the flow velocity of the gas injected from the downstream end of the high-pressure passage into the low-pressure passage. On the other hand, deformation of the downstream end of the high-pressure passage changes the flow velocity of the gas ejected from the downstream end of the high-pressure passage to the low-pressure passage. Therefore, deformation of the downstream end of the high-pressure passage may significantly change the amount of gas that flows from the connection passage into the low-pressure passage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, an ejector includes a high-pressure passage, a low-pressure passage, and a connection passage. The high-pressure passage includes an upstream end and a downstream end. The upstream end is configured to be connected to a passage through which a high-pressure gas flows. The low-pressure passage is connected to the downstream end of the high-pressure passage. The connection passage is connected to a junction of the high-pressure passage and the low-pressure passage. The high-pressure passage is bent at one or more locations between the upstream end and the downstream end.

With the above-described configuration, the high-pressure passage is bent at one or more locations. When gas flows through the high-pressure passage, the flow velocity of the gas decreases at the bent portions. This change in the flow velocity changes the magnitude of the negative pressure generated at the connection point between the high-pressure passage and the low-pressure passage. That is, with the above-described configuration, the magnitude of the negative pressure generated at the connection point between the high-pressure passage and the low-pressure passage is affected not only by the shape of the vicinity of the downstream end of the high-pressure passage, but also by the shape of the bent portions of the high-pressure passage. If the high-pressure passage has no bent portions, the flow velocity of the gas ejected from the high-pressure passage to the low-pressure passage is significantly affected by deformation of the vicinity of the downstream end of the high-pressure passage. On the other hand, the above-described configuration additionally has the influence of the bending of the high-pressure passage. Thus, even when the vicinity of the downstream end of the high-pressure passage is deformed, the magnitude of the negative pressure is not changed significantly. That is, the amount of gas flowing from the connection passage into the low-pressure passage is not changed significantly.

In the above-described configuration, a portion of the high-pressure passage that includes the downstream end is defined as a downstream portion. A cross-sectional flow area of at least a part of the downstream portion decreases toward the downstream end.

With the above-described configuration, gas is ejected at a high velocity as the cross-sectional flow area of the high-pressure passage decreases. This ensures a sufficient amount of gas flowing from the connection passage to the low-pressure passage.

In the above-described configuration, the low-pressure passage extends linearly. A portion of the high-pressure passage that includes the downstream end is defined as a downstream portion. A portion of the high-pressure passage that includes the upstream end is defined as an upstream portion. The upstream portion includes a portion that extends parallel to an imaginary plane orthogonal to a passage axis of the low-pressure passage.

If the lengths of the low-pressure passage and the high-pressure passage are the same, the above-described configuration reduces the dimension of the ejector in the direction along the passage axis of the low-pressure passage.

In the above-described configuration, the passage through which the high-pressure gas flows includes a pipe body having a higher flexibility than the high-pressure passage. With the above-described configuration, for example, a passage through which high-pressure gas flows is curved. This allows the passage to be routed flexibly.

In a second general aspect, a high-pressure passage for an ejector includes an upstream end and a downstream end. The upstream end is configured to be connected to a passage through which a high-pressure gas flows. The high-pressure passage is bent at one or more locations between the upstream end and the downstream end.

The above-described configuration additionally has the influence of the bending of the high-pressure passage. Therefore, when the high-pressure passage is connected to the low-pressure passage and the connection passage, deformation of the vicinity of the downstream end of the high-pressure passage does not significantly change the magnitude of the negative pressure. That is, the amount of gas flowing from the connection passage into the low-pressure passage is not changed significantly.

In a third general aspect, an intake housing defines a part of an intake passage of an internal combustion engine. The intake housing includes a main body that defines the intake passage and an ejector portion that defines a connection passage through which a fuel vapor flows. The ejector portion includes a high-pressure passage, a low-pressure passage, and the connection passage. The high-pressure passage includes an upstream end and a downstream end. The upstream end is configured to be connected to a passage through which a high-pressure gas flows. The low-pressure passage is connected to the downstream end of the high-pressure passage. The connection passage is connected to a junction of the high-pressure passage and the low-pressure passage. The high-pressure passage is bent at one or more locations between the upstream end and the downstream end. At least a part of the ejector portion is integrally molded with the main body.

With the above-described configuration, the high-pressure passage is bent at one or more locations. When gas flows through the high-pressure passage, the flow velocity of the gas decreases at the bent portions. This change in the flow velocity changes the magnitude of the negative pressure generated at the connection point between the high-pressure passage and the low-pressure passage. That is, with the above-described configuration, the magnitude of the negative pressure generated at the connection point between the high-pressure passage and the low-pressure passage is affected not only by the shape of the vicinity of the downstream end of the high-pressure passage, but also by the shape of the bent portions of the high-pressure passage. If the high-pressure passage has no bent portions, the flow velocity of the gas ejected from the high-pressure passage to the low-pressure passage is significantly affected by deformation of the vicinity of the downstream end of the high-pressure passage. On the other hand, the above-described configuration additionally has the influence of the bending of the high-pressure passage. Thus, even when the vicinity of the downstream end of the high-pressure passage is deformed, the magnitude of the negative pressure is not changed significantly. That is, the amount of gas flowing from the connection passage into the low-pressure passage is not changed significantly. Further, since at least a part of the ejector portion is integrally molded with the main body, the manufacturing costs are reduced as compared with a case in which the entire ejector portion is molded separately from the main body.

In the above-described configuration, a portion of the high-pressure passage that includes the upstream end is defined as an upstream portion. A portion of the ejector portion that defines a part including the upstream end of the upstream portion is defined as a coupling portion. The coupling portion is straight and tubular, and has a central axis. The main body includes a facing surface that faces the coupling portion with a clearance therebetween, the facing surface being parallel to the central axis of the coupling portion.

With the above-described configuration, the coupling portion of the ejector portion is disposed with a clearance between the coupling portion and the outer surface of the main body. This ensures a sufficient working space when a passage such as another hose or piping is connected to the coupling portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an ejector, and a high-pressure passage and an intake housing for the ejector according to one embodiment will be described with reference to the drawings.

<Engine System>

Figure 1:
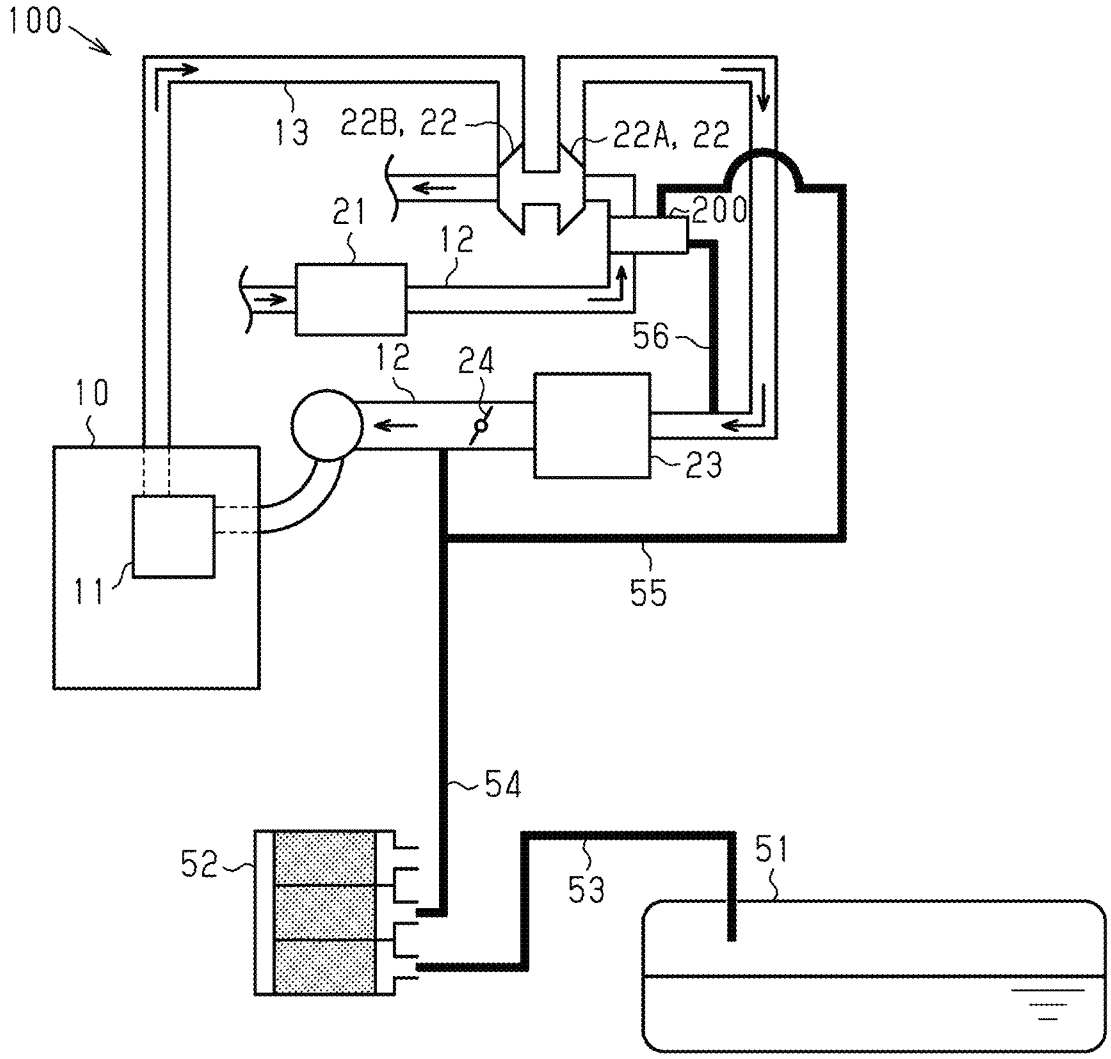
FIG. 1 is a diagram showing an engine system for which an intake housing including an ejector portion is used.

As shown in FIG. 1, an engine system 100 includes an internal combustion engine 10. The internal combustion engine 10 includes a cylinder 11, an intake passage 12, and an exhaust passage 13.

The internal combustion engine 10 is a drive source of a vehicle. The cylinder 11 is a space in which air-fuel mixture of intake air and fuel is burned. The intake passage 12 is a flow passage for intake air. The downstream end of the intake passage 12 is connected to the cylinder 11 of the internal combustion engine 10. The exhaust passage 13 is a flow passage for exhaust gas. The upstream end of the exhaust passage 13 is connected to the cylinder 11 of the internal combustion engine 10.

The engine system 100 includes an air cleaner 21, a turbocharger 22, an intercooler 23, and a throttle valve 24.

The air cleaner 21 is a device that removes foreign matter from intake air. The air cleaner 21 is located in the intake passage 12.

The turbocharger 22 includes a compressor 22A and a turbine 22B. The compressor 22A is located on the downstream side of the air cleaner 21 in the intake passage 12. The compressor 22A supplies compressed intake air to a section of the intake passage 12 that is on the downstream side of the compressor 22A. The turbine 22B is located in the exhaust passage 13. The turbine 22B is coupled to the compressor 22A with a shaft. When the turbine 22B is rotated by flow of exhaust gas, the compressor 22A rotates integrally with the turbine 22B.

The intercooler 23 is located on the downstream side of the compressor 22A in the intake passage 12. The intercooler 23 cools high-temperature air compressed by the compressor 22A. The throttle valve 24 is located on the downstream side of the intercooler 23 in the intake passage 12. The throttle valve 24 adjusts the amount of intake air flowing through the intake passage 12.

The engine system 100 includes a fuel tank 51, a canister 52, a vapor passage 53, a purge passage 54, a branch passage 55, a recirculating passage 56, and an intake housing 200.

The fuel tank 51 stores fuel to be supplied to the internal combustion engine 10. The vapor passage 53 is a passage through which fuel vapor generated in the fuel tank 51 flows. The upstream end of the vapor passage 53 is connected to the fuel tank 51. The canister 52 is connected to the downstream end of the vapor passage 53. The canister 52 adsorbs fuel vapor. The purge passage 54 is a passage that guides fuel vapor in the canister 52 into the intake passage 12 on the downstream side of the compressor 22A. The upstream end of the purge passage 54 is connected to the canister 52. The downstream end of the purge passage 54 is connected to the intake passage 12 on the downstream side of the throttle valve 24 in the intake passage 12.

The branch passage 55 is a passage that guides fuel vapor in the canister 52 into the intake passage 12 on the upstream side of the compressor 22A. The branch passage 55 branches off the purge passage 54. That is, the upstream end of the branch passage 55 is connected to the middle of the purge passage 54. The downstream end of the branch passage 55 is connected to the intake housing 200. The intake housing 200 will be described below.

The recirculating passage 56 is a passage that connects the intake passage 12 on the downstream side of the compressor 22A to the intake passage 12 on the upstream side of the compressor 22A. Specifically, the upstream end of the recirculating passage 56 is connected to the intake passage 12 on the upstream side of the intercooler 23 and on the downstream side of the compressor 22A. The downstream end of the recirculating passage 56 is connected to the intake housing 200.

<Intake Housing>

Figure 2:
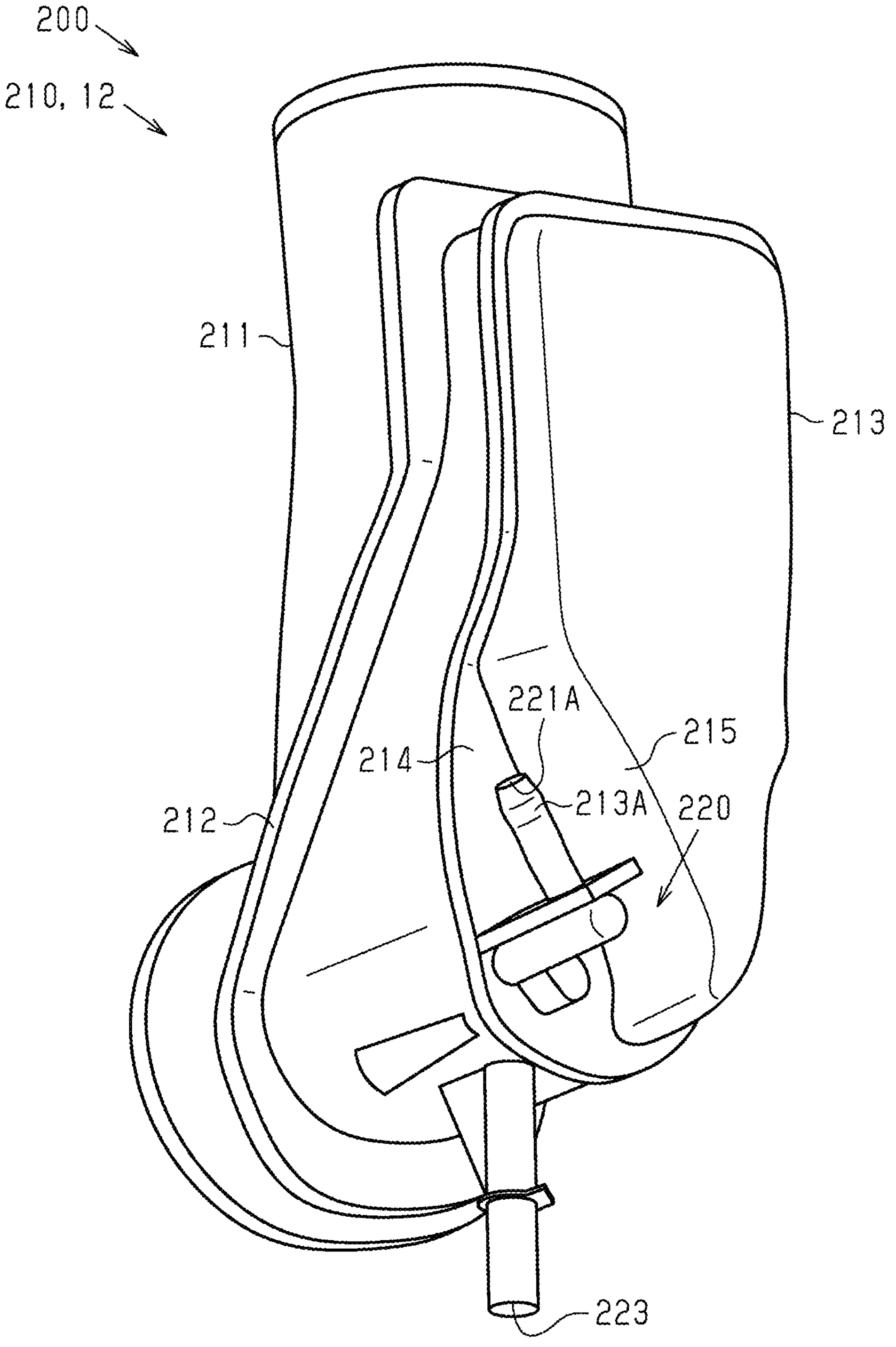
FIG. 2 is a perspective view of the intake housing.

As shown in FIG. 1, the intake housing 200 defines part of the intake passage 12 on the downstream side of the air cleaner 21 and on the upstream side of the compressor 22A. As shown in FIG. 2, the intake housing 200 includes a main body 210 and an ejector portion 220.

The main body 210 defines the intake passage 12. The main body 210 includes a first piece 211, a second piece 212, and a third piece 213. The first piece 211, the second piece 212, and the third piece 213 are all made of plastic.

The first piece 211 and the second piece 212 are joined to each other. The first piece 211 and the second piece 212 define part of the intake passage 12. The second piece 212 and the third piece 213 are joined to each other. The second piece 212 and the third piece 213 define a resonator space. Although not illustrated, the resonator space, which is defined by the second piece 212 and the third piece 213, is connected to the intake passage 12 defined by the first piece 211 and the second piece 212. Therefore, pressure fluctuations in the intake passage 12 propagate to the resonator space. The pressure fluctuations in the intake passage 12 are attenuated in the resonator space.

Figure 4:
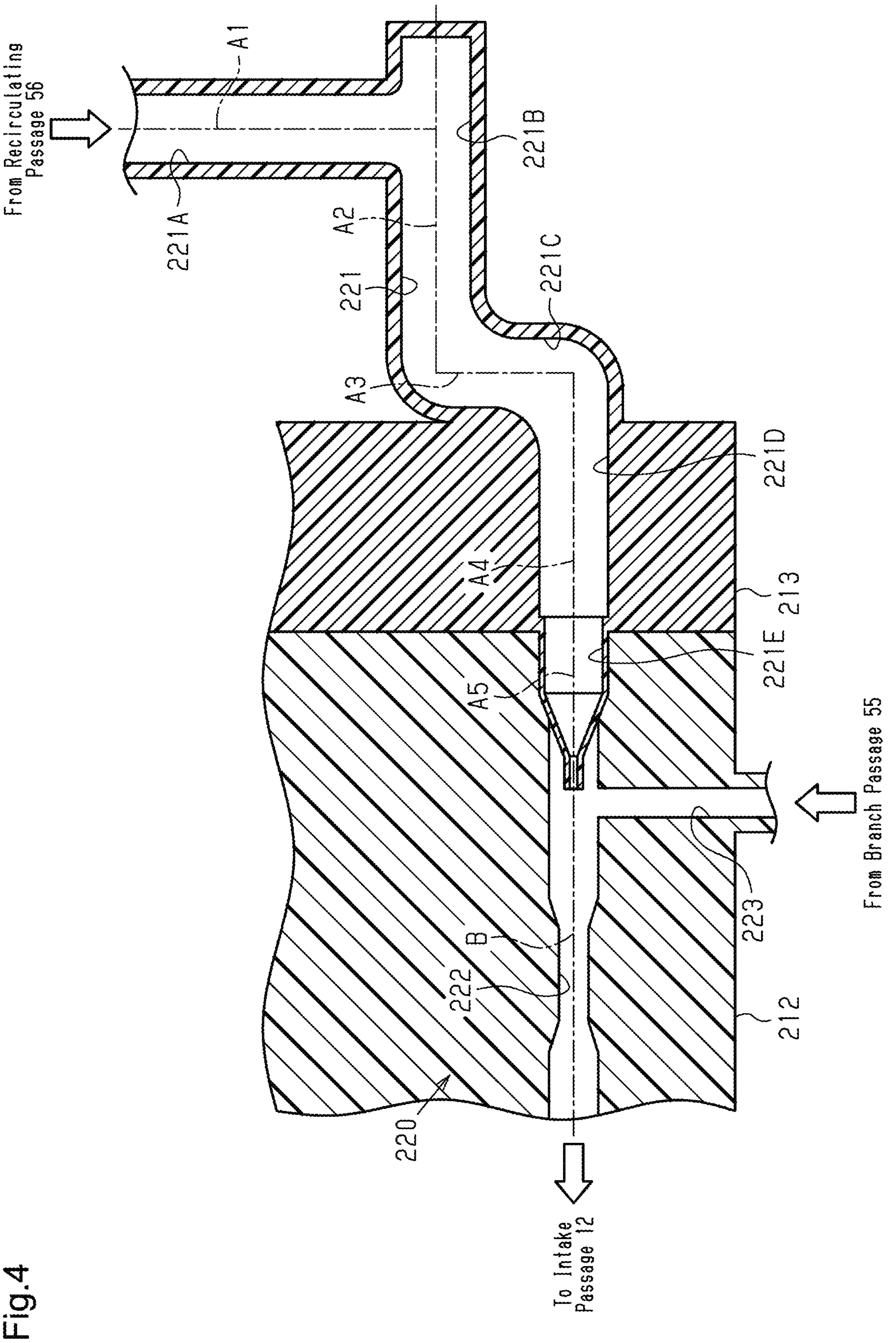
FIG. 4 is a cross-sectional view taken along line 4-4 in FIG. 3.

As shown in FIG. 4, each of the second piece 212 and the third piece 213 includes part of the ejector portion 220. The ejector portion 220 is part of the intake housing 200 to which the downstream end of the branch passage 55 and the downstream end of the recirculating passage 56 are connected.

The ejector portion 220 includes a high-pressure passage 221, a low-pressure passage 222, and a connection passage 223. The upstream end of the high-pressure passage 221 is connected to the downstream end of the recirculating passage 56. That is, the recirculating passage 56, through which high-pressure gas flows, is connected to the upstream end of the high-pressure passage 221. The recirculating passage 56 is a pipe body made of synthetic rubber. The material of the high-pressure passage 221 is plastic. The recirculating passage 56 is more flexible than the high-pressure passage 221.

The downstream end of the high-pressure passage 221 is connected to the low-pressure passage 222. The low-pressure passage 222 extends linearly. The downstream end of the low-pressure passage 222 is connected to a portion of the intake passage 12 that is defined by the first piece 211 and the second piece 212. The connection passage 223 extends linearly. The downstream end of the connection passage 223 is connected to a junction of the high-pressure passage 221 and the low-pressure passage 222. That is, the downstream end of the connection passage 223 is located in the vicinity of the downstream end of the high-pressure passage 221. The upstream end of the connection passage 223 is connected to the downstream end of the branch passage 55. The connection passage 223 is orthogonal to the low-pressure passage 222.

The high-pressure passage 221 further includes a first passage 221A, a second passage 221B, a third passage 221C, a fourth passage 221D, and a fifth passage 221E in that order from the upstream end.

The first passage 221A extends linearly. The upstream end of the first passage 221A is the upstream end of the high-pressure passage 221. Therefore, the first passage 221A, which is a portion including the upstream end of the high-pressure passage 221, corresponds to an upstream portion of the high-pressure passage 221. The cross-sectional flow area of the first passage 221A is constant from the upstream end to the downstream end.

The second passage 221B extends linearly. The upstream end of the second passage 221B is closed. The second passage 221B is connected to the downstream end of the first passage 221A in the vicinity of the upstream end of the second passage 221B. In each passage, a straight line including a locus tracing the center of the passage cross section is defined as a passage axis. A passage axis A2 of the second passage 221B is orthogonal to a passage axis A1 of the first passage 221A. The cross-sectional flow area of the second passage 221B is the same as the cross-sectional flow area of the first passage 221A. Further, the cross-sectional flow area of the second passage 221B is constant from the upstream end to the downstream end.

The third passage 221C extends linearly. The upstream end of the third passage 221C is connected to the downstream end of the second passage 221B. A passage axis A3 of the third passage 221C is orthogonal to the passage axis A2 of the second passage 221B. Further, the downstream end of the third passage 221C faces in a direction substantially opposite to the upstream end of the first passage 221A. The cross-sectional flow area of the third passage 221C is the same as the cross-sectional flow area of the first passage 221A. The cross-sectional flow area of the third passage 221C is constant from the upstream end to the downstream end.

The fourth passage 221D extends linearly. The upstream end of the fourth passage 221D is connected to the downstream end of the third passage 221C. A passage axis A4 of the fourth passage 221D agrees with a passage axis B of the low-pressure passage 222. The passage axis A4 of the fourth passage 221D is orthogonal to the passage axis A3 of the third passage 221C. The downstream end of the fourth passage 221D is oriented in substantially the same direction as the downstream end of the second passage 221B. The cross-sectional flow area of the fourth passage 221D is the same as the cross-sectional flow area of the first passage 221A. Further, the cross-sectional flow area of the fourth passage 221D is constant from the upstream end to the downstream end.

The fifth passage 221E extends linearly. The upstream end of the fifth passage 221E is connected to the downstream end of the fourth passage 221D. A passage axis A5 of the fifth passage 221E agrees with the passage axis A4 of the fourth passage 221D. The cross-sectional flow area at the upstream end of the fifth passage 221E is substantially the same as the cross-sectional flow area of the first passage 221A. In the middle portion of the fifth passage 221E, the cross-sectional flow area decreases toward the downstream end of the fifth passage 221E. The downstream end of the fifth passage 221E is the downstream end of the high-pressure passage 221. Therefore, the fifth passage 221E, which is a portion of the high-pressure passage 221 that includes the downstream end, is a downstream portion of the high-pressure passage 221. The cross-sectional flow area of the portion of the fifth passage 221E serving as the downstream portion decreases toward the downstream end.

As described above, the passage axis A4 of the fourth passage 221D and the passage axis A5 of the fifth passage 221E agree with the passage axis B of the low-pressure passage 222. In contrast, the passage axis A3 of the third passage 221C is orthogonal to the passage axis A4 of the fourth passage 221D. The first passage 221A to the third passage 221C are not on the passage axis B of the low-pressure passage 222. That is, the high-pressure passage 221 is bent at three locations between the upstream end and the downstream end.

The intake housing 200 defines each passage of the ejector portion 220. Specifically, the second piece 212 defines the low-pressure passage 222 and the connection passage 223 among the passages of the ejector portion 220. The third piece 213 defines the high-pressure passage 221 among the passages of the ejector portion 220. That is, each part of the ejector portion 220 is integrally molded with the second piece 212 or the third piece 213, which defines the main body 210.

In a state in which the second piece 212 and the third piece 213 are joined to each other, a portion of the third piece 213 that defines the fifth passage 221E is inserted into the upstream end of the low-pressure passage 222, which is defined by the second piece 212.

Figure 3:
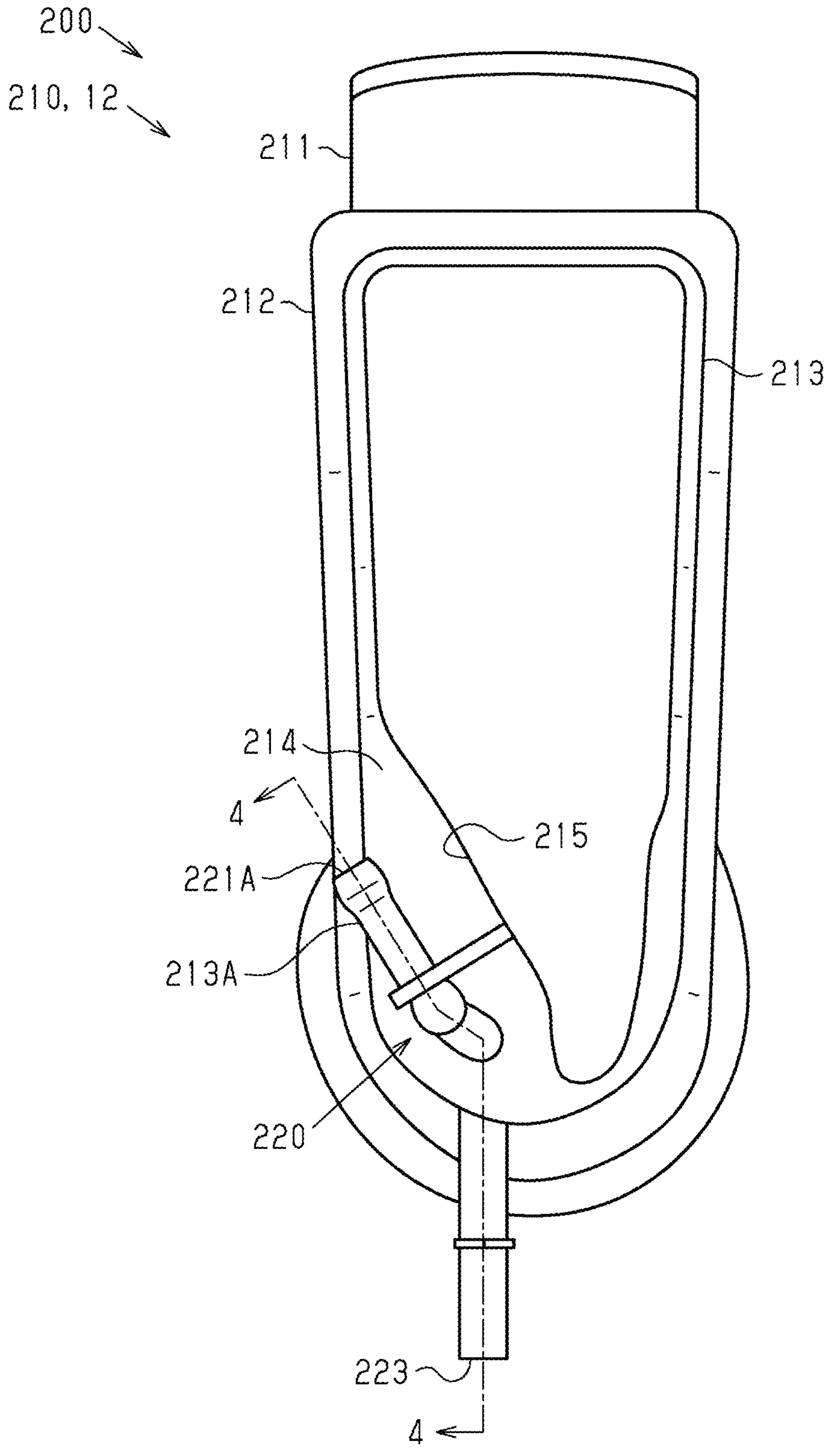
FIG. 3 is a side view of the intake housing.

As shown in FIGS. 2 and 3, a portion of the third piece 213 that defines the first passage 221A is referred to as a coupling portion 213A. The coupling portion 213A is cylindrical. The central axis of the coupling portion 213A is the passage axis A1. Although not illustrated, the coupling portion 213A is inserted into a pipe body that defines the recirculating passage 56.

As shown in FIG. 3, the third piece 213 has a first outer surface 214 and a second outer surface 215 that face the coupling portion 213A without other members interposed therebetween. The first outer surface 214 is orthogonal to the second outer surface 215. Each of the first outer surface 214 and the second outer surface 215 is a facing surface that faces the coupling portion 213A. The first outer surface 214 is parallel to the central axis of the coupling portion 213A, i.e., the passage axis A1. The second outer surface 215 is also parallel to the passage axis A1.

Operation of Present Embodiment

Intake air pressurized by the compressor 22A flows into the high-pressure passage 221 of the ejector portion 220 via the recirculating passage 56. The high-pressure passage 221 is bent by 90 degrees at each of the boundary between the first passage 221A and the second passage 221B, the boundary between the second passage 221B and the third passage 221C, and the boundary between the third passage 221C and the fourth passage 221D. That is, the high-pressure passage 221 has three bent portions. Therefore, the intake air flowing into the high-pressure passage 221 is bent three times to reach the low-pressure passage 222. High-pressure and high-temperature intake air that has been pressurized by the compressor 22A flows through the high-pressure passage 221. This may deform the high-pressure passage 221.

Advantages of Present Embodiment (1) In the above-described embodiment, when the intake air flows through the high-pressure passage 221, the flow velocity of the intake air decreases at the three bent portions. As the flow velocity changes, the magnitude of the negative pressure generated at the connection point between the high-pressure passage 221 and the low-pressure passage 222 changes. That is, in the above-described embodiment, the magnitude of the negative pressure generated at the connection point between the high-pressure passage 221 and the low-pressure passage 222 is affected not only by the shape of the vicinity of the downstream end of the high-pressure passage 221, but also by the shapes of the three bent portions of the high-pressure passage 221. If the high-pressure passage 221 is not bent, the flow velocity of the gas ejected from the high-pressure passage 221 to the low-pressure passage 222 is greatly affected when the vicinity of the downstream end of the high-pressure passage 221 is deformed. On the other hand, the configuration of the above-described embodiment additionally has the influence of the bending of the high-pressure passage 221. Thus, even when the vicinity of the downstream end of the high-pressure passage 221 is deformed, the magnitude of the negative pressure is not changed significantly. That is, the amount of gas flowing from the connection passage 223 into the low-pressure passage 222 is not changed significantly.

(2) In the above-described embodiment, the cross-sectional flow area of a portion of the fifth passage 221E decreases toward the downstream end. With the configuration of the above-described embodiment, gas is ejected to the low-pressure passage 222 at a high velocity as the cross-sectional flow area of the high-pressure passage 221 decreases. This increases the magnitude of the negative pressure generated at the connection point between the high-pressure passage 221 and the low-pressure passage 222. This ensures a sufficient amount of gas flowing from the connection passage 223 to the low-pressure passage 222.

(3) In the above-described embodiment, an imaginary plane orthogonal to the passage axis B of the low-pressure passage 222 is assumed. In this case, the first passage 221A, which is an upstream portion of the high-pressure passage 221, extends parallel to the imaginary plane. Similarly, the third passage 221C extends parallel to the imaginary plane. If the lengths of the low-pressure passage 222 and the high-pressure passage 221 are the same, the above-described configuration reduces the dimension of the ejector portion 220 in the direction along the passage axis B of the low-pressure passage 222.

(4) In the above-described configuration, the recirculating passage 56 is more flexible than the high-pressure passage 221. With this configuration, for example, the recirculating passage 56 is curved. This allows the recirculating passage 56 to be routed flexibly.

(5) In the above-described embodiment, the ejector portion 220 is integrally molded with the main body 210. With this configuration, since the ejector portion 220 is integrally molded with the main body 210, the manufacturing costs are reduced as compared with a case in which the entire ejector portion 220 is molded separately from the main body 210.

(6) In the above-described embodiment, the first outer surface 214 of the main body 210 faces the coupling portion 213A with a clearance therebetween. The second outer surface 215 of the main body 210 faces the coupling portion 213A with a clearance therebetween. The first outer surface 214 is parallel to the central axis of the coupling portion 213A, i.e., the passage axis A1 of the first passage 221A. The second outer surface 215 is parallel to the central axis of the coupling portion 213A. This configuration ensures a sufficient working space when a pipe such as the recirculating passage 56 is connected to the coupling portion 213A.

<Modifications>

The above-described embodiment may be modified as follows. The above-described embodiment and the following modifications can be combined as long as the combined modifications remain technically consistent with each other.

The configuration of the engine system 100 is not limited to the example of the above-described embodiment. The engine system 100 may be modified as long as it includes the intake housing 200. The engine system 100 illustrated as the embodiment is merely an example, and the engine system 100 may further include other devices and members.

The main body 210 of the intake housing 200 is not limited to the configuration including three pieces as in the above-described embodiment. The main body 210 may include one piece or two pieces. The main body 210 may include four or more pieces.

The intake housing 200 does not necessarily need to define a resonator space. The intake housing 200 may define at least a part of the intake passage 12.

The main body 210 does not necessarily need to have a facing surface that faces the coupling portion 213A with a clearance therebetween and is parallel to the passage axis A1 of the coupling portion 213A. As long as the coupling portion 213A can be coupled to another pipe or the like, the coupling portion 213A may be in contact with any surface of the main body 210 or may intersect with any surface of the main body 210.

The ejector portion 220 does not necessarily need to be configured as part of the intake housing 200, but may be configured as a component separate from the intake housing 200, that is, as an ejector. Even in this case, the above-described advantages (1) to (3) are obtained.

The shape of the high-pressure passage 221 is not limited to the example of the above-described embodiment. For example, the number of bent portions of the high-pressure passage 221 of the ejector portion 220 may be four or more or two or less. When a portion of the high-pressure passage 221 that includes the downstream end and extends on the passage axis B is referred to as a downstream portion, the high-pressure passage 221 may be bent at least at one point from the upstream end to the downstream end.

In the high-pressure passage 221, the bending angle does not necessarily need to be 90 degrees. Alternatively, the high-pressure passage 221 may be curved in an arcuate shape. The bending angle and the radius of curvature of the curve may be determined flexibly as long as a negative pressure is generated that causes gas to flow from the connection passage 223 to the low-pressure passage 222.

The material of the high-pressure passage 221 and the material of the recirculating passage 56 are not limited to the examples in the above-described embodiment. For example, the material of the high-pressure passage 221 may be plastic. The recirculating passage 56 is preferably more flexible than the high-pressure passage 221. However, even if the recirculating passage 56 is equally flexible as or less flexible than the high-pressure passage 221, the above-described advantage (1) is obtained.

In the ejector portion 220, the fifth passage 221E does not necessarily include a portion in which the cross-sectional flow area changes. Even if the cross-sectional flow area of the fifth passage 221E is constant, the above-described advantage (1) is obtained.

The cross-sectional flow areas of the first passage 221A to the fourth passage 221D do not necessarily need to be the same. For example, the cross-sectional flow area of the first passage side 221A and the cross-sectional flow area of the second passage side 221B may be different. Further, in one or more passages selected from the first passage 221A to the fourth passage 221D, the cross-sectional flow area may decrease toward the low-pressure passage 222.

The passage axis of the connection passage 223 does not necessarily need to be orthogonal to the passage axis A5 of the fifth passage 221E and the passage axis B of the low-pressure passage 222. That is, the connection passage 223 may be connected obliquely to the high-pressure passage 221 and the low-pressure passage 222.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An intake housing that defines a part of an intake passage of an internal combustion engine, the intake housing comprising:

a main body that defines the intake passage; and an ejector portion that defines a connection passage through which a fuel vapor flows, wherein the ejector portion includes:

a high-pressure passage including an upstream end and a downstream end, the upstream end being configured to be connected to a passage through which a high-pressure gas flows;

a low-pressure passage connected to the downstream end of the high-pressure passage; and the connection passage connected to a junction of the high-pressure passage and the low-pressure passage, the high-pressure passage is bent at one or more locations between the upstream end and the downstream end, at least a part of the ejector portion is integrally molded with the main body, a portion of the high-pressure passage that includes the upstream end is defined as an upstream portion, a portion of the ejector portion that defines a part including the upstream end of the upstream portion is defined as a coupling portion, the coupling portion is straight and tubular and has a central axis, and the main body includes a facing surface that faces the coupling portion with a clearance therebetween, the facing surface being parallel to the central axis of the coupling portion.

* * * * *